United States Patent [19]
Fritz et al.

[11] 3,918,373
[45] Nov. 11, 1975

[54] SOLID WASTE DISPOSAL SYSTEM

[75] Inventors: Jack J. Fritz, Buffalo; Theodore W. Lucas, Jr., Williamsville, both of N.Y.

[73] Assignee: Andco Incorporated, Buffalo, N.Y.

[22] Filed: Dec. 14, 1973

[21] Appl. No.: 424,814

[52] U.S. Cl................. 110/8 R; 110/10; 110/56; 165/7
[51] Int. Cl............................................. F23g 7/00
[58] Field of Search ............ 110/8 R, 10, 56; 165/7

[56] References Cited
UNITED STATES PATENTS

| | | | |
|---|---|---|---|
| 1,054,850 | 3/1913 | Leask | 110/10 |
| 1,236,986 | 8/1917 | Sanborn et al. | 110/10 |
| 2,582,830 | 1/1952 | Hawley | 110/56 X |
| 3,509,834 | 5/1970 | Rosenberg et al. | 110/8 R |
| 3,557,723 | 1/1971 | Miller | 110/8 R |
| 3,675,600 | 7/1972 | Jones | 110/8 R |

*Primary Examiner*—Albert W. Davis, Jr.
*Attorney, Agent, or Firm*—Christel & Bean

[57] ABSTRACT

Air to effect combustion in a vertical gasification chamber is preheated by passing it in heat exchange relation with a regenerator previously heated by a portion of the waste gas from a secondary combustion chamber, the balance of the waste gas being utilized elsewhere. A predetermined flow of waste gas to the regenerator is obtained by controlled proportioning of the waste gas.

3 Claims, 3 Drawing Figures

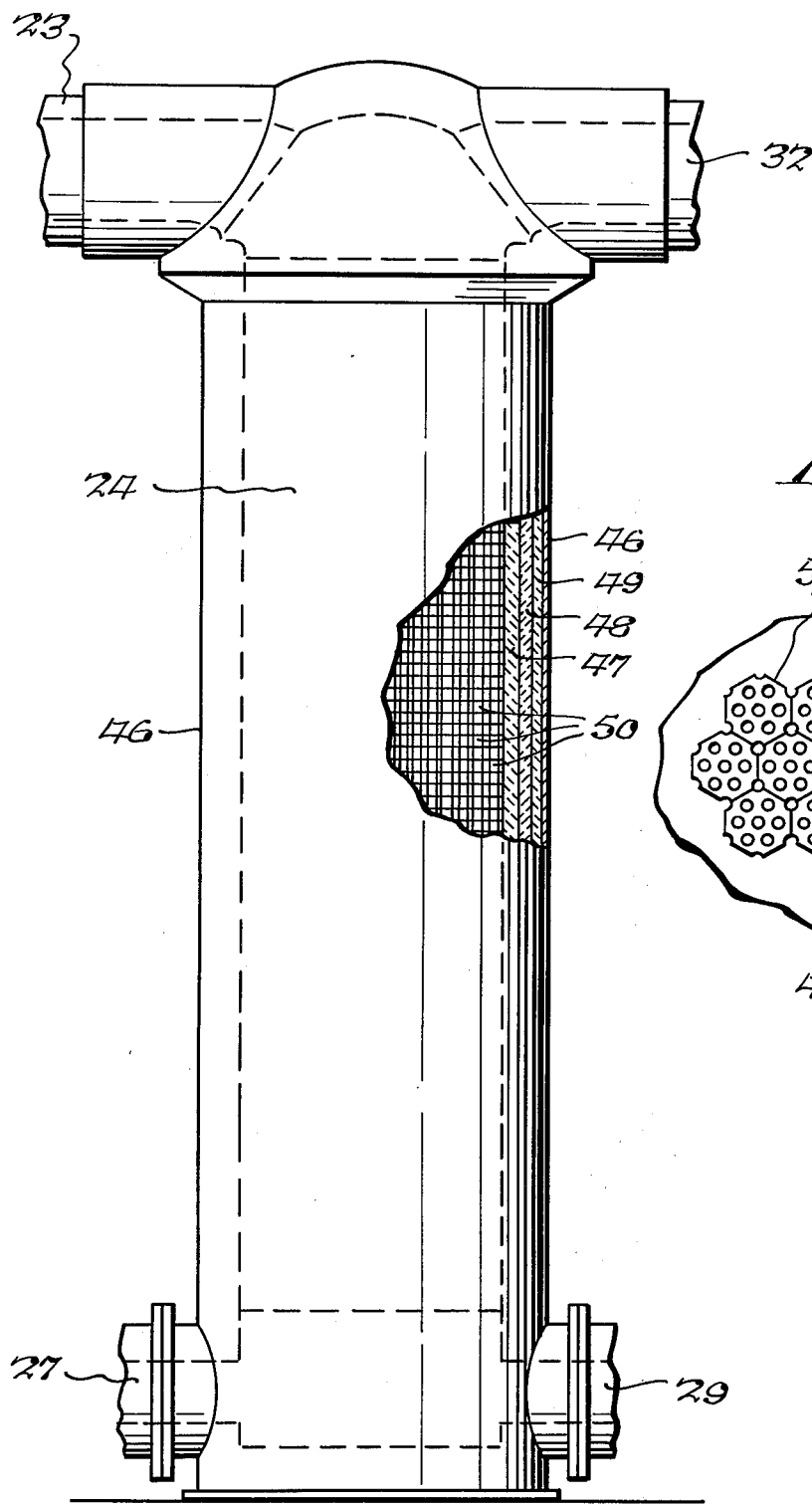

SOLID WASTE DISPOSAL SYSTEM

BACKGROUND OF THE INVENTION

This invention relates to slagging pyrolysis solid waste disposal systems, and more particularly to the utilization of waste gas from the system to preheat air for supporting combustion within the system.

In slagging pyrolysis solid waste disposal systems, preheated air is needed to effect partial combustion of the waste. It has been customary to use a special auxiliary heated to supply this air. Experience has shown that a significant amount of fuel is required for such auxiliary heater and such additional fuel requirement decreases the overall efficiency of the system.

SUMMARY OF THE INVENTION

The primary object of this invention is to effectively and efficiently utilize the hot products of combustion from the system to preheat the combustion air for the system.

This is accomplished by diverting a portion of the hot products of combustion from the system in heat exchange relation to combustion air, in an amount sufficient to provide the heat input necessary to preheat the combustion air, with the remaining hot products of combustion passing to a boiler or other means for utilizing the thermal energy contained therein.

BRIEF DESCRIPTION OF THE DRAWING FIGURES

FIG. 2 is an elevational view of one of the regenerative towers used in the system of Fig. 1, a portion being broken away to show interior details; and Fig. 3 is a fragmentary, horizontal sectional view showing the part broken away in Fig. 2.

DETAILED DESCRIPTION OF THE ILLUSTRATED EMBODIMENT

Figure 1:
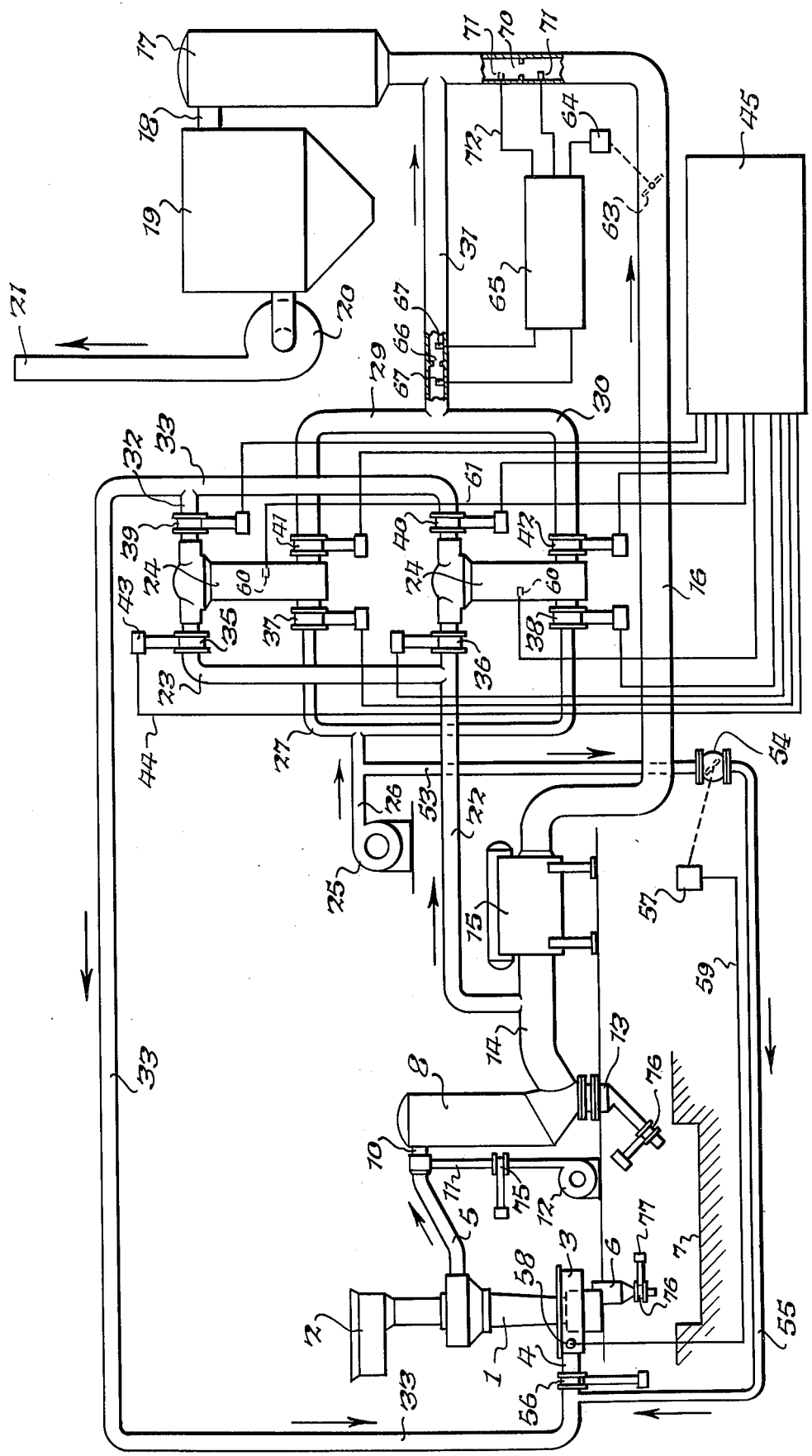
FIG. 1 is a generally schematic view, partly broken away to show details, showing one form of solid waste disposal system incorporating this invention.

Referring first to the schematic layout of Fig. 1, there is shown a vertical gasification chamber 1, sometimes referred to as a gasifier, having a charging hopper 2 at its upper end for the introduction of the solid waste, and having at its lower end a hearth surrounded by a tuyere burner manifold 3 to which heated air for combustion is supplied via conduit 4. As the waste is consumed, by pyrolysis, the gaseous products of combustion are withdrawn via conduit 5 while the burned solids are removed in the form of slag through a tank 6 emptying into a slag pit 7 under control of a valve 76.

The gases passing through conduit 5 have particulate material entrained therein which is removed by burning in a secondary combustion chamber 8 having at its upper end a burner 10 supplied with the gases from chamber 1 and with air to support combustion in chamber 8, the air being supplied via conduit 11 and a blower 12 under control of a valve 75. The burned solids are removed from chamber 8 in the form of a slag through a tank 13 which also empties into slag pit 7 under control of a valve 76. The gaseous products of combustion exit from chamber 8 by way of a waste gas line 14 communicating with an energy conversion apparatus, such as a waste heat boiler 15, for utilization of thermal energy in the waste gas. From boiler 15 the waste gas is transmitted via conduit 16 to a cooler 17 where the gas is further cooled before passing via conduit 18 to an electrostatic precipitator 19, the cleaned gas then being discharged by a fan 20 to a cleaned gas stack 21. Valves 75 and 76 can be of any suitable conventional design actuated by a conventional motor 77 in response to any suitable control, not shown.

Heretofore the practice has been to provide a special, externally fueled heater to preheat the air provided through inlet 4 to the first combustion chamber 1. This is inefficient because it requires additional fuel, and it is a feature of this invention that the thermal energy necessary for preheating the combustion air is instead derived from the secondary combustion chamber waste gas. This is accomplished by diverting a portion of the secondary combustion chamber waste gas from line 14 into heat exchange relation with the combustion air. In the illustrated embodiment the diverted portion of the waste gas is transmitted by a conduit 22 which, together with an extension 23, conveys the diverted gas to alternating ones of a pair of regenerative towers 24 which are arranged to cycle, with one tower being heated by the diverted waste gas while the other, already heated in this manner, is used to heat air which is supplied by a fan 25 via conduits 26 and 27. After the diverted waste gas has been utilized in the regenerative towers, it is discharged via conduits 29 and 30 to a common exhaust conduit 31 which joins conduit 16 prior to the cooler 17. The air, after being heated by the towers 24, is delivered to the hot air inlet 4 via conduits 32 and 33.

The inlets to the towers 24 are controlled by valves 35 and 36 on the waste gas side, and by valves 37 and 38 on the cold air inlet side. The heated air outlets are controlled by valves 39 and 40 while the spent waste gas outlets are controlled by valves 41 and 42.

The various valves can be of any suitable type, such as a gate type of valve adapted to withstand the relatively high temperatures which are encountered with the heated gases, and are adapted to be moved by suitable motors, all indicated by the number 43 and each having an electric lead connection such as shown at 44 to a timer, cycling and sequencing control panel and apparatus, generally indicated at 45.

The towers 24 can be of any suitable design able to withstand the temperatures and gas products here involved. In the illustrated form they are similar to blast furnace stoves, having a casing 46 lined with a combination of refractory and insulating materials, indicated at 47, 48 and 49 in FIGS. 2 and 3 are filled with checker brick 50 which can be of a type well known in the blast furnace art, being made of a refractory material adapted to store heat imparted to it from hot gases passing through the passages 51, and to yield that heat to the cooler air passing through those passages 51 in the opposite direction. While a particular checker brick shape is illustrated, it will be appreciated that other shapes and types can be used.

The control mechanism 45 can be of a known type, set to actuate the various valves so that the hot waste gas diverted from conduit 14 is passed through one of the regenerative towers 24, to heat up its checker work, while the cooler, fresh air is passed in the opposite direction through the already heated checker work of the other tower 24. Then after a predetermined time interval calculated to provide the desired operating temperature in the tower being heated, control 45 automatically reverses the various valves controlling the inlets and outlets to and from the towers 24, so that the other tower, which has been heating air for combustion, now will be heated by the diverted waste gas while the first tower, just heated, will be used to heat the combustion air. Since the various sequencing controls, motors and valves can be of any suitable type, known to those familiar with the regenerator art, any additional illustration and description thereof is believe unnecessary.

The heated air passing to inlet 4 will initially be at a higher temperature, in many instances, than desired and can be diluted by mixing it with air delivered by fan 25 via conduit 53, valve 54 and conduit 55 joining the heated air conduit 33 just prior to a control valve 56 for inlet 4. Valve 54 is controlled by a motor 57 responsive to the inlet air temperature as detected by a temperature sensor 58 connected thereto by lead 59, for regulating valve 54 to maintain the inlet air temperature at a desired level. It will be appreciated that as the tower 24 cools, the air will be heated to progressively decreasing temperatures, requiring lesser quantities of cool air for dilution to achieve the desired temperature. The temperature of the towers also is sensed, by sensors 60 connected via leads 61 to the master control 45, both to provide a temperature indication at the control panel and to provide an over control in the event of a particular tower becoming too hot or too cool.

In this way, a portion of the heat energy in the waste gas from the secondary combustion chamber is used to heat the incoming air to the first combustion chamber, avoiding the necessity of a separately fueled heating arrangement. Futher in accordance with this invention, only as much of the waste gas as is needed for this purpose is diverted from the waste gas line 14 and boiler 15 where the remainder of the waste gas is converted into useful energy whereby the thermal energy of the waste gas is fully utilized. The desired proportioning of the waste gas poses a problem, however, when solid wastes are the basic fuel material, because such waste material is subject to fairly wide variation in its composition and burning rate, with the result that the waste gas flow from the secondary combustion chamber will vary. It is important, for proper operation of the regenerative towers, to maintain a relatively constant flow of hot waste gas to the regenerator system, both with respect to the sequencing-timing control, and to the heat-up cycle of the towers.

Therefore, it is a feature of this invention that the flow of waste gas from conduit 14 through conduit 22 to the regenerative towners is carefully controlled. This is accomplished by proportioning the relative flow to regenerators 24 and boiler 15. In the illustrated embodiment, such proportioning control is provided by a valve 63 in the discharge conduit 16 from the waste heat boiler 15, in this case a butterfly valve, which varies the effective size of the conduit 16 and therefore creates a back pressure which in turn will be reflected in conduit 14 and determine the relative flow of gas into boiler 15 and into conduit 22. Valve 63 is actuated by a motor 64 in response to a control system generally indicated at 65 which is responsive to the flow of gas through the regenerative outlet conduit 31, causing motor 64 to adjust the position of valve 63 to regulate the flow through conduit 16 in a manner maintaining a substantially constant flow of waste gas conduit 22. The flow in conduit 31 can be measured by any suitable means, in the illustrated embodiment by measuring the pressure drop across a restriction 66, using a pair of sensors 67 connected by leads 68 to the control 65 which can be of any suitable type for actuating motor 64 in the desired direction, in response to variations in the flow as sensed by the members 67. It is contemplated that only a minor portion of the secondary combustion chamber waste gas, for example on the order of 10–20 percent, will be diverted to the regenerators, with the remaining, major portion passing boiler 15. Control valve 63 should be in the line presenting the least line loss, in this case the larger diameter conduit 16, with the control flow being measured in the smaller diameter conduit 31.

The flow through conduit 16 downstream of valve 63 can be determined, for example by measuring the pressure drop across a restriction 70, using pressure responsive sensors 71 connected to the control 65 by leads 72, both to indicate the total flow to the cooler 17, and also the relative proportion of waste gas being diverted to the regenerator portion of the system. Motor 64, control 65 and pressure sensors 67, 71 can be of any suitable, conventional design.

Thus, it is seen that the system of this invention accomplishes its intended objects. It will be appreciated that the foregoing detailed description is intended to be illustrative only.

We claim:

1. In a slagging pyrolysis sold waste disposal system having a combustion chamber, energy conversion means, and means for delivering gaseous products of combustion to said energy conversion means, a plurality of regenerator means for preheating combustion air, means for diverting a portion of the gaseous products of combustion from said energy conversion means through each of said regenerator means, means for delivering combustion air through each of said regenerator means, for being heated thereby, to said combustion chamber, valve means associated with said plurality of generator means for sequentially directing the flow of combustion air and gaseous products of combustion through different regenerator means so that the gaseous products of combustion provide heat to be stored in said regenerators whereby such heat is given off to the subsequent flow of combustion air therethrough, and means for varying the relative proportion of combustion products diverted to said plurality of regenerator means to maintain a predetermined flow of combustion products thereto, said flow control means including means to monitor the downstream flows from said plurality of regenerator means and said energy conversion means and valve means operated in response to said monitoring means to control the flow of combustion products in one of said downstream flows in response to the flow of combustion products from the other of said downstream flows to thereby control the flow of combustion products to said plurality of regenerator means 2. The system of claim 1, together with means for diluting the preheated air with cooler air to maintain a predetermined combustion air temperature.

3. In a slagging pyrolysis solid waste disposal system having a combustion chamber, energy conversion means, and means for delivering gaseous products of combustion to said energy converstion means, a regenerator means for preheating combustion air, means for diverting a portion of the gaseous products of combustion from said energy conversion means through said regenerator means, means for delivering combustion air through said regenerator means, for being heated thereby, to said combustion chamber, and flow control means for varying the relative proportion of combustion products diverted to said regenerator means to maintain a predetermined flow of combustion products thereto, siad flow control means including means to monitor the downstream flows from said regenerator means and said energy conversion means and valve means operable in response to said monitoring means to control the flow of combustion products in one of said downstream flows in response to the flow of combustion products from the other of said downstream flows to thereby control the flow of combustion products to said regenerator system.

* * * * *

UNITED STATES PATENT OFFICE
CERTIFICATE OF CORRECTION

Patent No. 3,918,373          Dated November 11, 1975

Inventor(s) Jack J. Fritz and Theodore W. Lucas, Jr.

It is certified that error appears in the above-identified patent and that said Letters Patent are hereby corrected as shown below:

Column 4, line 27, "sold" should be -- solid -- line 38, "generator" should be -- regenerator --

Column 4, line 64, "converstion" should be --conversion--

Column 5, line 6, "siad" should be -- said --.

Signed and Sealed this ninth Day of March 1976

[SEAL]

Attest:

RUTH C. MASON
*Attesting Officer*

C. MARSHALL DANN
*Commissioner of Patents and Trademarks*